B. F. AUGUSTINE.
ROTARY ENGINE.
APPLICATION FILED MAY 6, 1915.

1,414,976.

Patented May 2, 1922.
8 SHEETS—SHEET 3.

B. F. AUGUSTINE.
ROTARY ENGINE.
APPLICATION FILED MAY 6, 1915.

1,414,976.

Patented May 2, 1922.
8 SHEETS—SHEET 6.

Inventor
Benjamin F. Augustine
By
Attorney

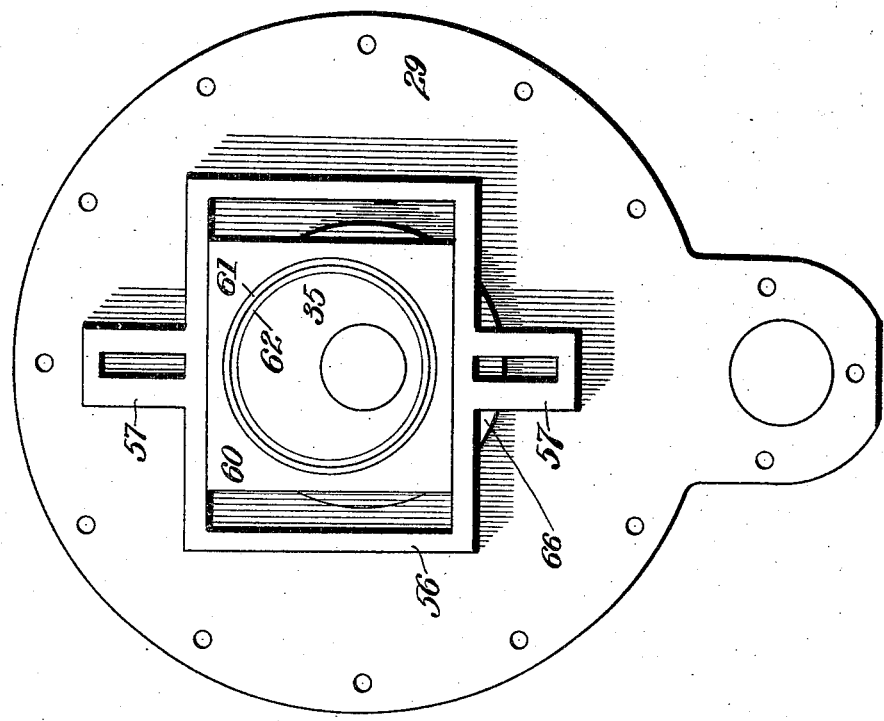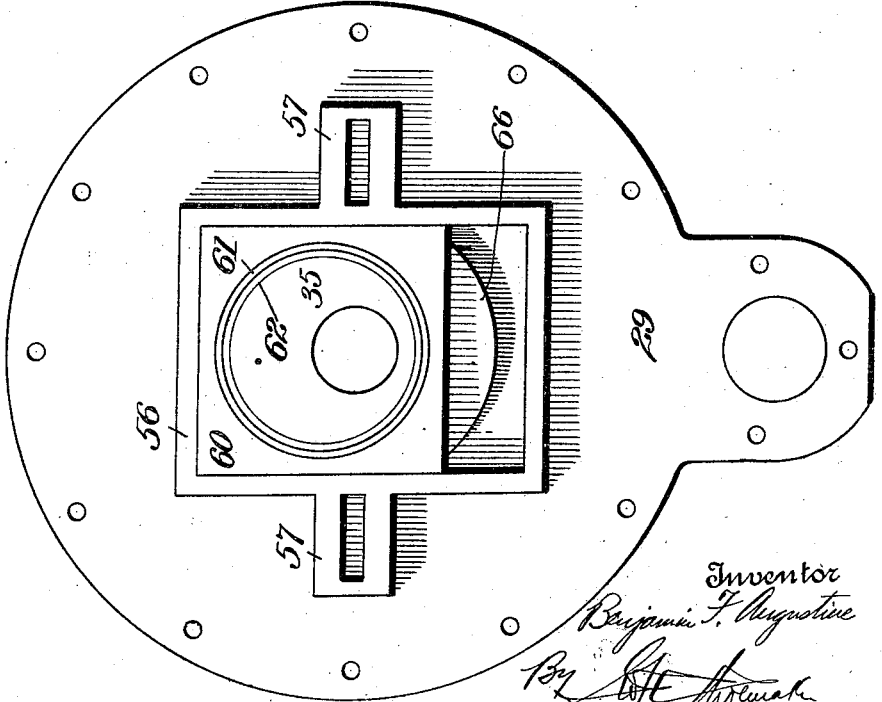

UNITED STATES PATENT OFFICE.

BENJAMIN FRANKLIN AUGUSTINE, OF BUFFALO, NEW YORK.

ROTARY ENGINE.

1,414,976.  Specification of Letters Patent.  Patented May 2, 1922.

Application filed May 6, 1915. Serial No. 26,314.

*To all whom it may concern:*

Be it known that I, BENJAMIN F. AUGUSTINE, a citizen of the United States, residing at Buffalo, in the county of Erie and State of New York, have invented certain new and useful Improvements in Rotary Engines, of which the following is a specification.

This invention relates to new and useful improvements in rotary engines, wherein a rotatable carrier having radial pistons is caused to rotate by the expansive force of a compressed fluid such as steam, compressed air, or the like.

An object of the invention is to provide a construction of rotary engine of the above type, wherein opposed radial pistons have continuous free running contact with the inner wall of the cylinder and wherein said radial pistons are rigidly connected together, so as to be held in fixed relation to each other at all points in the rotation of the carrier.

A further object of the invention is to provide a rotary engine having a rotating carrier which makes free running contact with the wall of the cylinder with means movable with the rotating carrier and operating in succession for trapping a portion of the operating fluid at the point of contact between the rotating carrier and the wall of the cylinder, whereby a continuous fluid seal is formed between the high and low pressure sides of said rotating carrier.

A still further object of the invention is to provide an operating eccentric for the valve which is shifted relative to the center of rotation of the shaft of the engine by a governor and which eccentric is formed in two sections, together with means for shifting the sections on each other as the eccentric is shifted to vary the eccentricity thereof, so as to maintain the high point of the eccentric always in the same radial position.

These and other objects will in part be obvious and will in part be hereinafter more fully described.

In the drawings which show by way of illustration one embodiment of the invention:—

Fig. 7 is a view of the inner face of one of the cylinder end plates or heads illustrating the position of the piston connecting and operating means.

Fig. 8 is a view similar to Fig. 7 showing the piston connecting and operating means in different position.

Fig. 12 illustrates diagrammatically the valve operating eccentrics of the governor mechanism.

Figure 1:
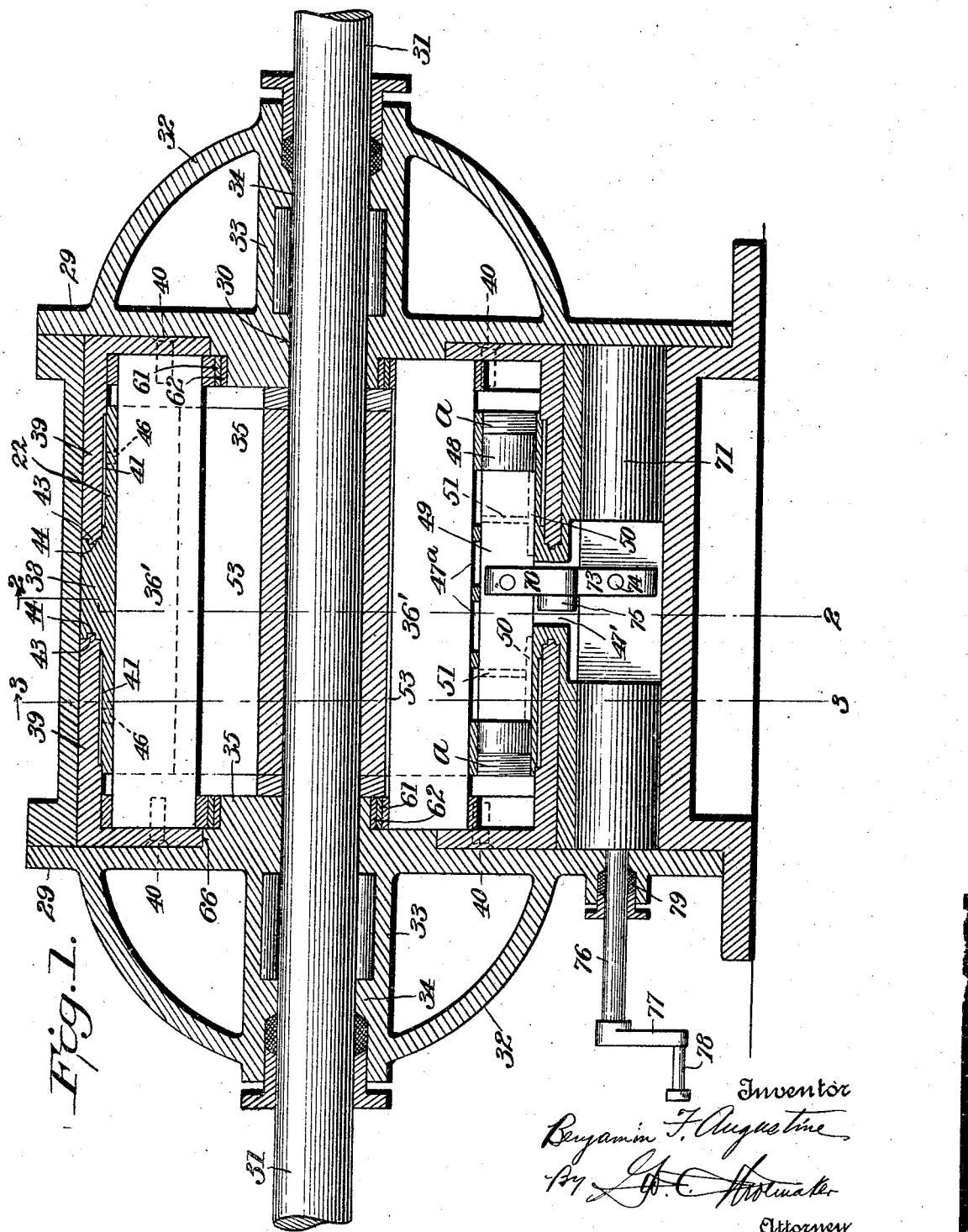
Fig. 1 is a longitudinal sectional view of the engine on the line 1—1 of Fig. 2.

Referring now more particularly to the accompanying drawings the casing or frame of the engine consists of a suitable supporting base 20 on which is mounted a cylinder 21 which is preferably cast integral with the base. The cylinder 21 is formed with a cylindrical chamber in which is located an abutment 22. The base of the casing is formed with an inlet 23 which is connected by suitable pipe connections with a source of fluid supply (not shown). The character 24 indicates an exhaust chamber having an exhaust outlet 25.

The base is provided with a chamber 26 on its inlet side and which is separated from the exhaust chamber 24 by a wall 27. The inlet chamber 26 has an open side which is normally closed by a removable plate 28.

At the ends of the cylinder are suitable end plates 29. These end plates are bolted to the end walls of the cylinder and are provided with central openings forming bearings 30 in which rotates the main shaft 31. Each plate 29 has a semi-globular shaped projection or head 32 connected with the plates 29 by the tubular webs 33, each tubular web 33 having an internal bearing 34 cooperating with the bearings 30 to support the main shaft 31. Suitable packing and glands are used for the main shaft. Each end plate 29 has an internal eccentric 35 on which is located the operating mechanism for the radial pistons 36' on the rotatable piston carrier 37, which mechanism will be hereinafter more fully described. The abutment 22 is formed with a cylindrical chamber 36 which is eccentrically disposed in the abutment, which chamber constitutes the con-cylinder proper and in which the rotatable piston carrier 37 is eccentrically disposed in concentric relation to the casing 21. The piston carrier 37 is so proportioned as to engage the wall of the cylindrical chamber 36 at one portion only thereof. The radial pistons 36' are so proportioned as to be held continually in contact with the wall of the cylindrical chamber 36 as the piston carrier 37 rotates. The abutment is formed on the outer face thereof with a centrally disposed circumferential rib 38. This rib 38 fits snugly within the cylinder 21 and any lateral thrust against the abutment will be imparted through said rib to the supporting cylinder. Caps 39 are carried by the rotatable piston carrier by means of suitable fastenings 40 and fit over the ends of the abutment. The outer face of the abutment has a series of pockets 41 which are circumferentially arranged about the abutment and extend from a point adjacent the central rib 38 to a point adjacent the ends of the abutment. These pockets are separated by ribs 42 extending longitudinally of the abutment. The caps 39 are so proportioned as to have a smooth running fit with the ribs 42 and each has an annular tongue 43 adapted to have smooth running fit in the respective annular groove 44 formed in the sides of the annular rib 38 to prevent leakage. Each cap 39 also has an internal annular ring 45 adapted to run smoothly on the respective outer end of the abutment adjacent the outer ends of the respective ribs 42 whereby the outer ends of the pockets 41 are closed by the ribs 45 and the outer sides of said pockets closed by the annular portions of the caps, forming closed pockets. Each pocket 41 is connected with the cylindrical chamber 36 by a port 46 so that the operating fluid in the cylindrical chamber 36 will pass through said ports 46 into the pockets 41 disposed around the outer face of the abutment and said operating fluid will create a pressure against the caps 39 mounted on the piston carrier 37. The abutment is provided with a valved chamber 47 which extends substantially from end to end of the same and which has an intake passage 47' leading from the chamber 26 and an outlet port 27$^a$ which leads into the cylindrical chamber 36. An oscillating balanced valve A is mounted in this chamber 47 and consists preferably of cylindrical end portions 48 and an intermediate flat portion 49. This balanced valve A is maintained within the chamber 47 by means of screw threaded or other caps $a$ fitted in the ends of the chamber, as shown particularly in Fig. 1 and the valve mounted therein is designed to control the supply of fluid to the cylinder from the chamber 26 through the ports 47$^a$ into the cylindrical chamber 36. The said valve is located close to the inner wall of the abutment so as to be close to the cylindrical chamber 36 to thereby reduce to a minimum the clearance between the valve and the radial pistons 36'. To effect a perfect balance of the valve it is provided on its under edge between its cylindrical portion 48 with pockets 50 into which the operating fluid may pass from the cylindrical chamber 36 through the apertures 51 formed transversely through the flattened portion 49 of the valve so that the pressure on opposite sides of the valve may be equalized to efficiently balance the valve. The abutment on its side opposite the inlet port 47 is provided with an exhaust port 52 which connects with the exhaust chamber 24. This exhaust port 52, as shown in the drawings, is formed by a plurality of slots which extend through the abutment.

From the foregoing it will be apparent that the operating fluid is introduced into the cylindrical chamber 36 between the rotary piston carrier and abutment and causes the piston carrier to rotate after which the spent fluid will be forced out of the cylindrical chamber through the exhaust ports 52.

The piston carrier 37 is rigidly connected with the main shaft 31, and, as above noted, it is so proportioned as to have a smooth running contact with the wall of the cylindrical chamber 36 in the abutment 22. The carrier has its smooth running engagement with the abutment at a point substantially midway between the port 47$^a$ and the exhaust 52 and it is formed with oppositely disposed grooves 53 in which are mounted the radial pistons 36'. At each end of the piston carrier is an end disk 54. These end disks are provided with walls 55 on their inner faces which, together with the outer surface of the piston carrier and the inner surface of the cylindrical chamber in the abutment, form the expansion or explosion chamber of the engine. These end disks are formed with external substantially rectangular shaped recesses 55 which slidably receive yokes 56, which yokes are housed and guided in said recesses. Each yoke has oppositely projecting members 57 provided with elongated slots 58 to receive the ends of the radial pistons 36'. These projections 57 slide in the guide grooves or walls 59 leading from opposite sides of the walls 55 out through the peripheries of the end disks. Intersecting centrally and longitudinally these guiding grooves or recesses 59 are the aforesaid guiding grooves 53 for the radial pistons 36'. A bearing block 60 is located in each of the recesses 55 and engages the inner end walls of the respective yokes 56. Each bearing block 60 has a central opening provided with a hardened ring 61 fixed therein. These blocks 60 are adapted to receive through their said openings the respective fixed eccentrics 35 of the end plates 29 of the engine casing, there being a hardened annular wearing ring 62 secured to the outer walls of each of said eccentrics 35. The eccentrics 35 cooperate with the bearing blocks 60 to move the same to cause the yokes 56 to shift the radial pistons.

The yokes are rigid and the pistons are rigidly connected thereto so that the radial pistons are always held in fixed relation to each other during the entire rotation of the carrier. The wall of the cylinder instead of being a true circle in cross section is turned so that said radial pistons may have continuous but free running contact with the inner wall of the cylinder at each point in the rotation of the carrier. The result is that there is little or no loss of the expanding fluid from one side of the radial piston to the other and the rotating force of the fluid will be all directed against the effective radial piston and the centrifugal force operating upon one piston will be perfectly balanced by the centrifugal force operating upon the other piston. The mounting of the rigid yokes in the recesses of the end disks of the rotatable carrier provides for an effective bearing of the yokes and the radial pistons so that the lateral strain of the expanding forces transmitted by the radial pistons to the rotating carrier is distributed over a very large area which reduces greatly the wear between these parts as the same slide one on the other.

One of the end disks 54 of the carrier may be made integral, if desired, with the same, while the other may be made detachable or both may be detachable from the body of the piston carrier, as may be desired. The end caps 39 are secured to the end disks 54 by means of the aforesaid fastenings 40, as above noted, and these fastenings may be easily and readily positioned or removed through the apertures 63 and 64, formed in the end caps 39 and the disks 54, respectively. The outer ends of the caps 39 are provided with central openings 65 adapted to be positioned on the respective annular shoulders 66 formed on the inner faces of the end plates 29, as shown particularly in Fig. 1, whereby the yokes 56 and the respective blocks 60 are completely housed within the engine between the ends of the piston carrier and the end caps 39 and leakage of the operating fluid prevented.

By the above construction it will be apparent that I have provided a piston carrier with radial pistons which are so operated as to be held in smooth running contact with the wall of the cylindrical chamber 36 and, regardless of the speed of the engine said radial pistons will be properly counterbalanced one by the other, so that undue wear between the radial pistons and the wall of the cylinder is obviated.

As has been stated the wall of the cylindrical chamber 36 is turned so that the radial pistons make continuous but free running contact with the wall of the cylinder at each point in the rotation of the carrier and at a point preferably between the ports $47^a$ and 52 this carrier makes contact with the wall of the cylindrical chamber. To prevent undue wear at this point of contact between the wall of the cylindrical chamber and the rotatable piston carrier 37 and to provide for a free rotation of the rotatable member with little or no wear on the cylindrical chamber wall, and to provide for an effective seal between the high and low pressure sides of the cylinder, I preferably flute or groove the surface of the carrier between the end disks 54 thereof as indicated by the character $b$. These flutes or grooves $b$ are preferably arranged longitudinally and are located very close together and are preferably rectangular in cross section. The grooves are relatively small and operate in succession one after another to trap the fluid and compress the same so as to form an effective liquid seal at the point of contact between the carrier and the cylinder for the purposes stated.

I have not only provided a perfect counterbalance of the centrifugal forces acting on the pistons, but I have also provided means for counterbalancing the lateral forces acting on the piston carrier. This means includes the aforesaid pockets 41 in the outer surface of the abutment 22 and the end caps 39 which latter are subjected to the pressure of the fluid in said pockets. The combined area of the pockets 41 at the outer surface of the abutment is substantially the same as the area of the outer surface of the rotatable piston carrier. As the piston carrier rotates the radial piston will uncover one port 46 after another, so that the surface on the rotatable carrier exposed to the operating fluid is kept substantially equal to the surface on the end caps 39, which latter are exposed to the same forces of the operating fluid. Inasmuch as these surfaces are at the same time exposed to the operating fluid, the pressure on a unit area of the carrier at any given point in the rotation of the piston carrier will be the same as the pressure on a unit area of a cap. Inasmuch as these forces are opposed to each other the one will counterbalance the other and, therefore, all the objectionable lateral strains on the piston carrier are neutralized so that the carrier will rotate freely on its bearings regardless of the pressure load in the cylindrical chamber 36. Furthermore, by introducing a certain amount of lubricant into the cylindrical chamber 36 the centrifugal force will carry the same out through the aforesaid ports 46 into said chambers 41 and the caps 39 will practically float on the lubricant support in the pockets in the outer surface of the abutment. By this construction I have formed a support on which the carrier runs smoothly without any vibration or chatter, even though the carrier be slightly off center. The end thrust on the carrier due to the operating fluid, whether it be incident to the expansion of steam or gases in the cylindrical chamber 36, will be perfectly counterbalanced as the forces acting on one end disk 54 will be overcome by the thrust acting on the opposite end disk 54.

In each of the ports 46 formed in the abutment to establish passages between the cylindrical chamber 36 and the chambers 47 on the outer side of the abutment, is a check valve 67 which normally opens outward and which prevents the fluid which is passed through the passages to said pockets 41 from passing back into the cylindrical chamber 36 at any time, or in the event that there is a leak between two adjacent pockets 41 when said pockets are positioned respectively on opposite sides of a radial piston so that the passages leading from the pockets 41 will connect with the high and low pressure sides of the cylinder. These pockets 41 in the outer face of the abutment become filled with fluid or lubricant or both and the caps counterbalance the non-rotative forces of the operating fluid on the rotating carrier so that said rotatable carrier floats on its bearings as it rotates.

The valve 51 is oscillated by means of an arm 70 which is secured to the valve by a clamping bolt or other suitable means and this arm projects downwardly through the passage 47' into the inlet chamber 26. The main casing of the engine is provided with suitable cylindrical recesses which lead into the inlet chamber 26 and mounted in these recesses is an operating shaft 71 for the valve. Said operating shaft is formed with cylindrical ends which fit the recesses so as to form a suitable bearing support for said shaft. The ends of these recesses are closed by the end plates 29. The shaft 71 from one side of the inlet passage 26 to the other is cut away to form a flat section 72. This flat section is provided with an upwardly extending arm 73 which is bolted to the shaft by a suitable bolt 74. The upper end of the arm 73 is connected by a link 75 to the downwardly projecting arm 70 on the valve. From the above it will be noted that an oscillation of the shaft 71 will impart an oscillation to the valve 51. The shaft 71 has a reduced extension 76 which is provided with a crank arm 77 carrying a crank pin 78. The end plate 29 has a suitable packed stuffing box 79 through which the extension passes. The shaft 71 is oscillated by an eccentric 80 on the main shaft 31. This eccentric is provided with an eccentric shaft 81 and the eccentric strap is connected to the crank pin 78 by the usual eccentric rod 82. This eccentric as the main shaft rotates will impart an oscillation to the shaft 71 which in turn will impart an oscillation to the valve 51.

I also provide means for controlling the extent of oscillation of the intake valve from the speed of the engine. This controlling means consists of a pivoted bracket 83 which carries the eccentric 80. This eccentric 80 has a segmental slot 84 so that the bracket 83 may be swung about its pivot 85 and this movement of the bracket will vary the eccentricity of said eccentric 80. The bracket 83 is connected by an arm 86 to a governor weight 87. This governor 87 is carried by a spring arm 88 fixed to the fly wheel 89 which, in turn, is fixed to the main shaft 31. As the speed of the fly wheel increases the centrifugal force acting on the weight 87 will force the same outward away from the center of the shaft and this swinging of the bracket 83 will move the eccentric toward the center of the shaft so as to decrease the throw of the eccentric, while on the other hand, when the speed of the fly wheel decreases then the spring 88 will force the weight 87 toward the center of the shaft and this, in turn, will swing the bracket so as to move the eccentric outward away from the center of the shaft and thus increase the throw of the eccentric which will likewise increase the throw of the intake controlling valve 51.

When the throw of the eccentric is increased the time of the initial opening of the intake valve will be advanced for the reason that the throw of the eccentric necessary to open the valve will occur at an early part in the angular rotation of the eccentric. It is desirable to maintain the time of opening the intake valve substantially at the same point in the angular rotation of the piston carrier so as to avoid varying the clearance between the valve and the radial pistons when the valve is initially opened. I have made the eccentric 80 in the form of a ring which is mounted so that said eccentric ring may be arranged angularly when the throw of the eccentric is varied. Said eccentric ring 80 is mounted on a central hub 90 and said eccentric hub 90 is rigidly secured by a pin 91 to the bracket 83. It is this center hub 90 which has the segmental slot 84 formed therein so as to permit the hub to swing with the bracket without interfering with the main shaft 31. Said hub has an integral shoulder 92 on one side thereof and a face plate 93 clamped to the hub by screws 94 which holds the eccentric ring 80 on the hub but permits the same to move freely angularly about the hub. The eccentric strap 81 is made in two sections as is usual, and these two sections engage the outer surface of said eccentric ring. A rod 94' is pivoted at 95 to the fly wheel and is pivoted at 96 to said eccentric ring. It will be noted that this rod 94' is located on the opposite side of the center of the main shaft 31 from the bracket 83. When the eccentric and its supporting hub are moved outwardly to increase the throw of the eccentric as the speed of the engine decreases, the rod 94' moving outwardly will turn the ring 80 so as to vary the angular position of the maximum throw of said eccentric. This outward movement of the eccentric would tend to advance the time of initial opening of the intake valve. The swinging of the eccentric ring on the outward movement of the eccentric will compensate for the shifting of the eccentric so as to maintain the throw of the eccentric which initially opens the valve at substantially the same point in the angular rotation of said eccentric.

In Fig. 12 I have shown diagrammatically the supporting hub, the eccentric ring, the controlling rod 94', and the shifting bracket 83. This figure will make clear the manner of shifting the position of the eccentric ring to compensate for its increase or decrease throw.

Figure 2:
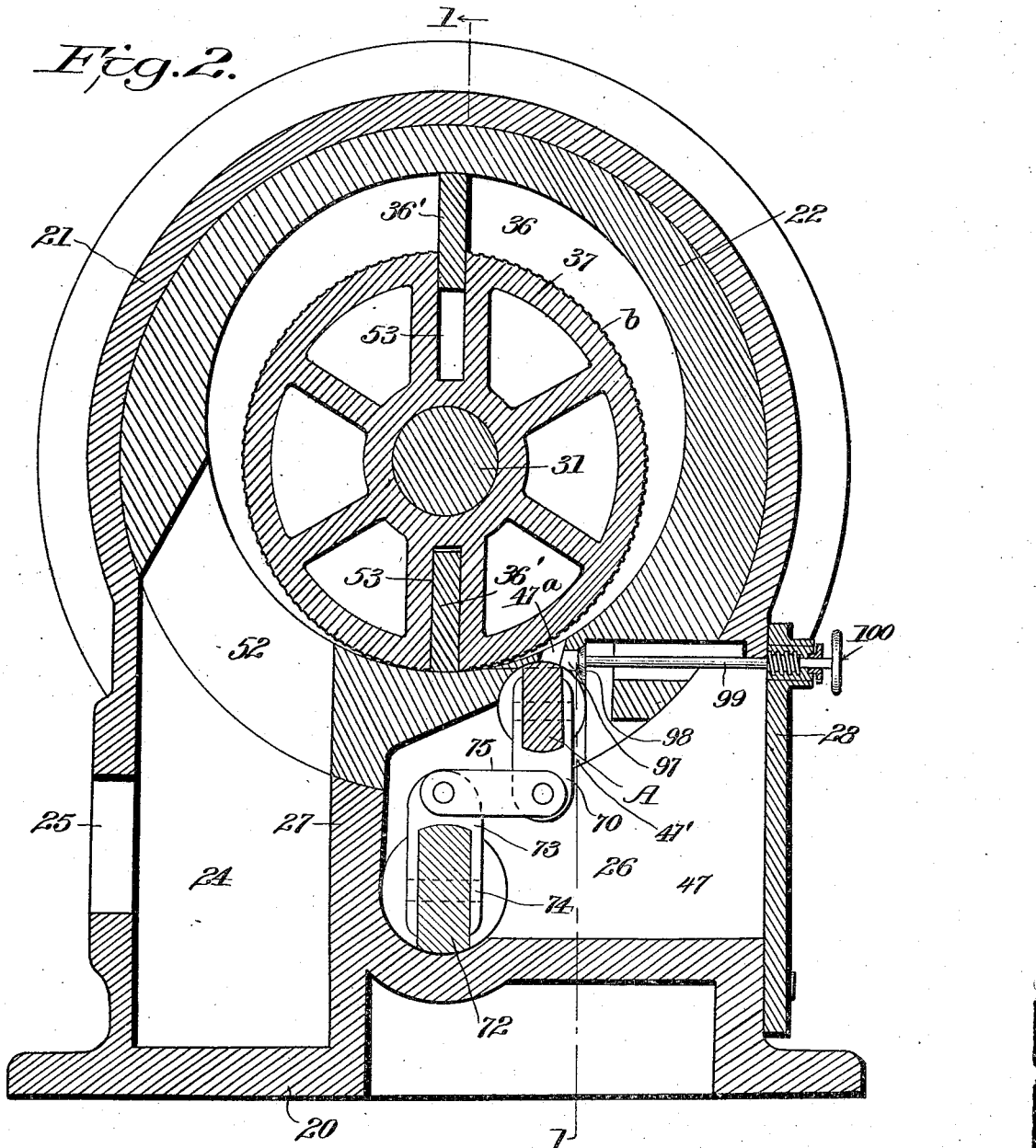
Fig. 2 is a vertical transverse sectional view on the line 2—2 of Fig. 1.
Figure 3:
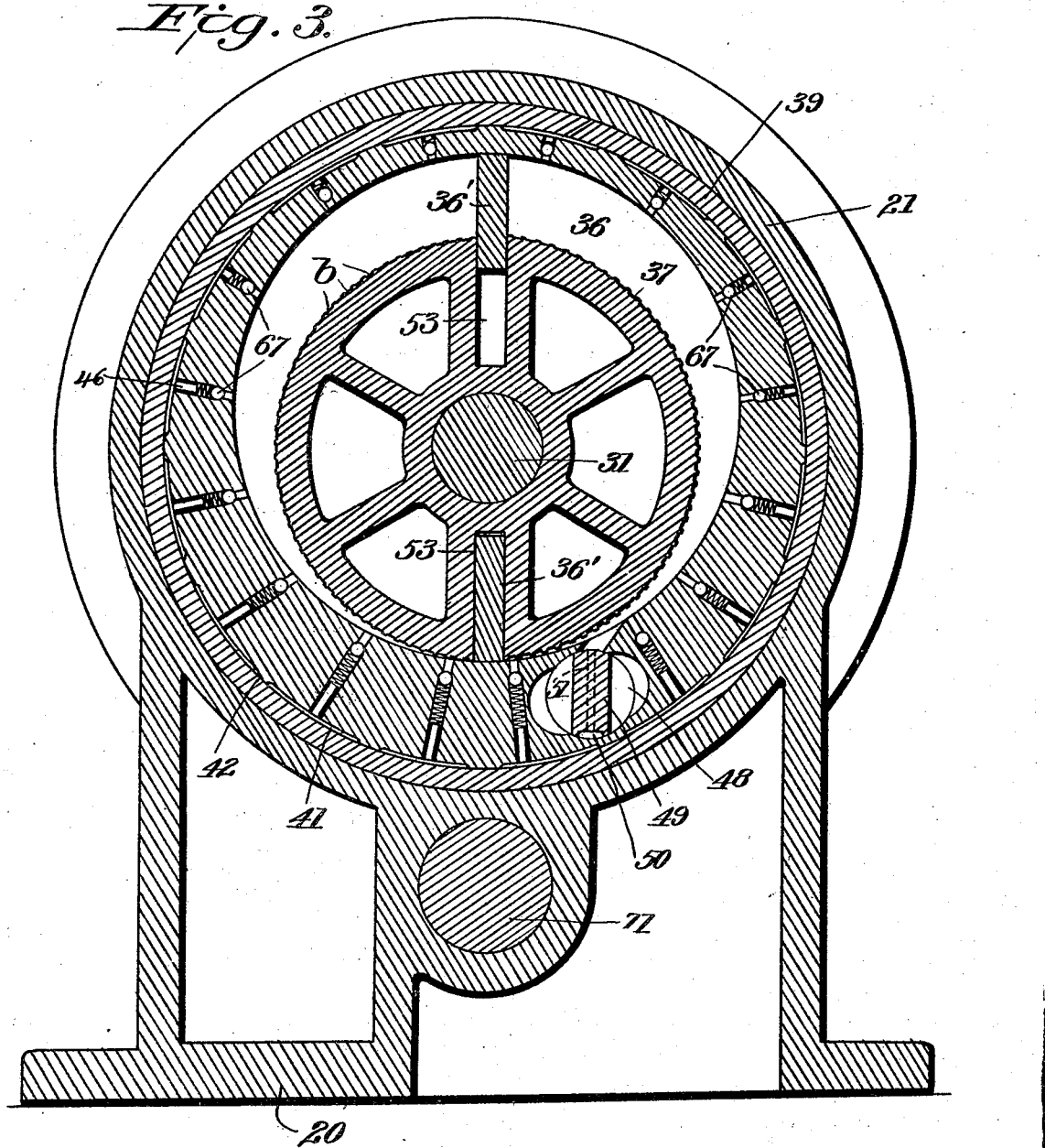
Fig. 3 is a transverse sectional view on the line 3—3 of Fig. 1.
Figure 4:
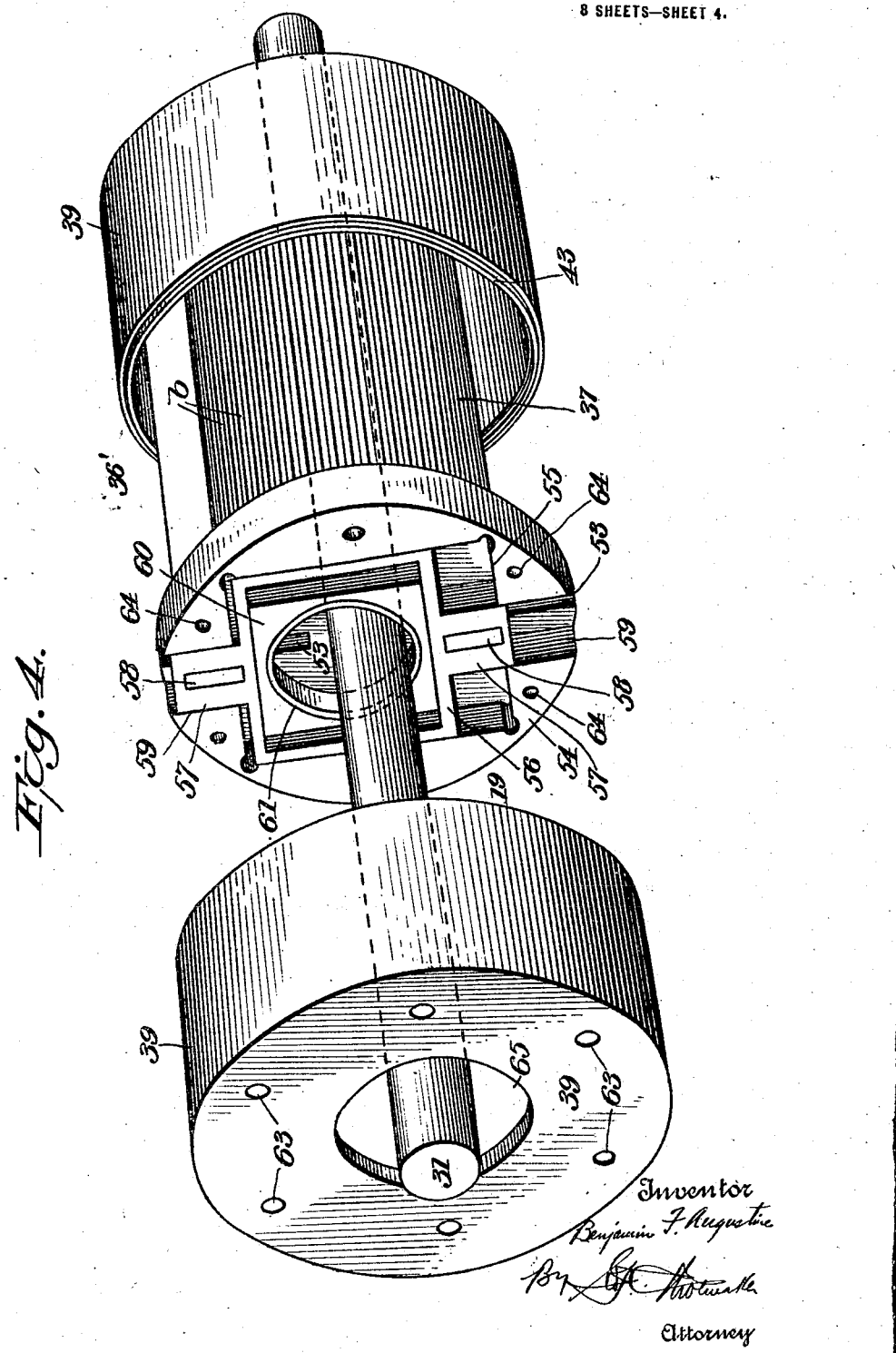
Fig. 4 is a detail perspective view of the rotatable carrier with one of the telescoping end caps applied and the other spaced from operative position with relation to the carrier to illustrate the connecting mechanism between the pistons.
Figure 5:
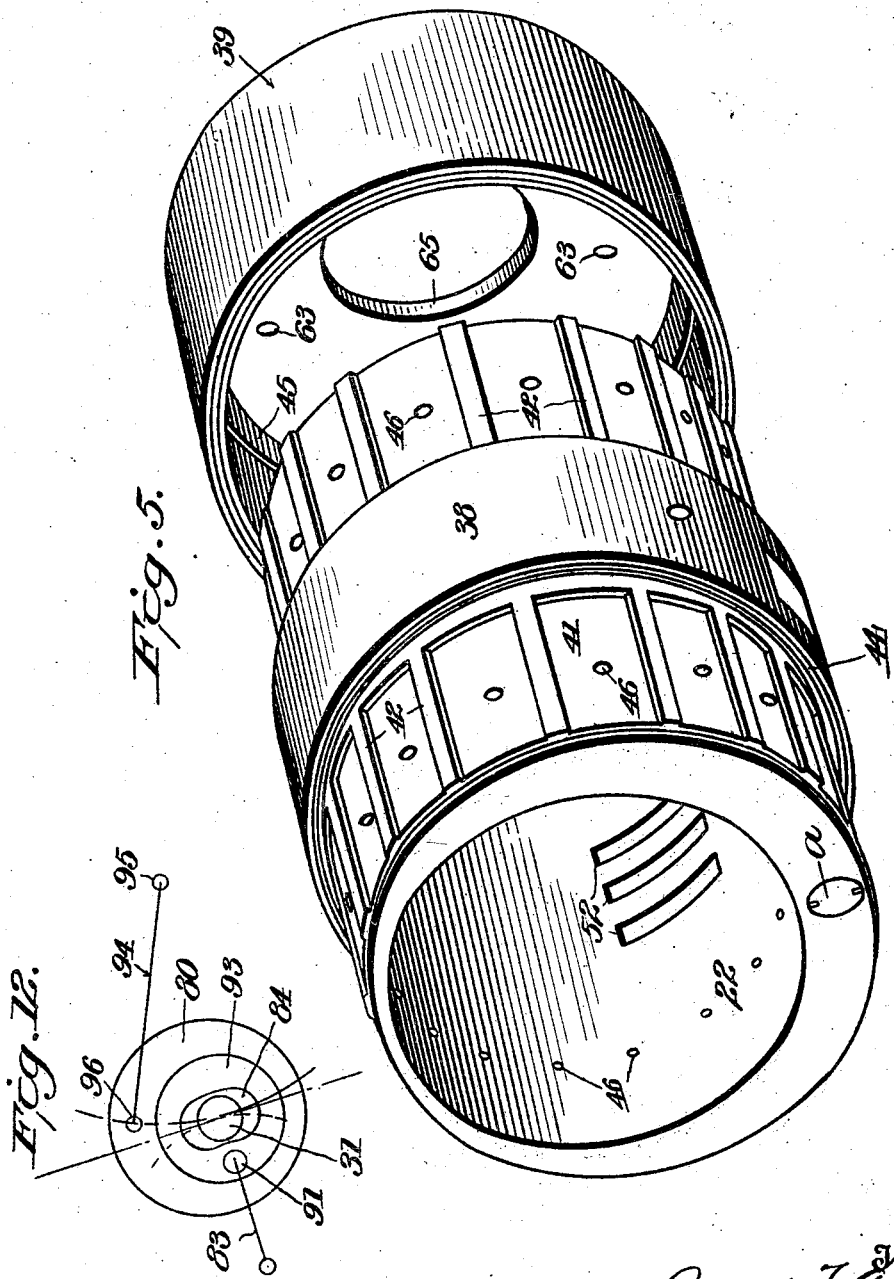
Fig. 5 is a detail perspective view of the abutment illustrating one of the telescoping end caps positioned for application to the abutment.
Figure 6:
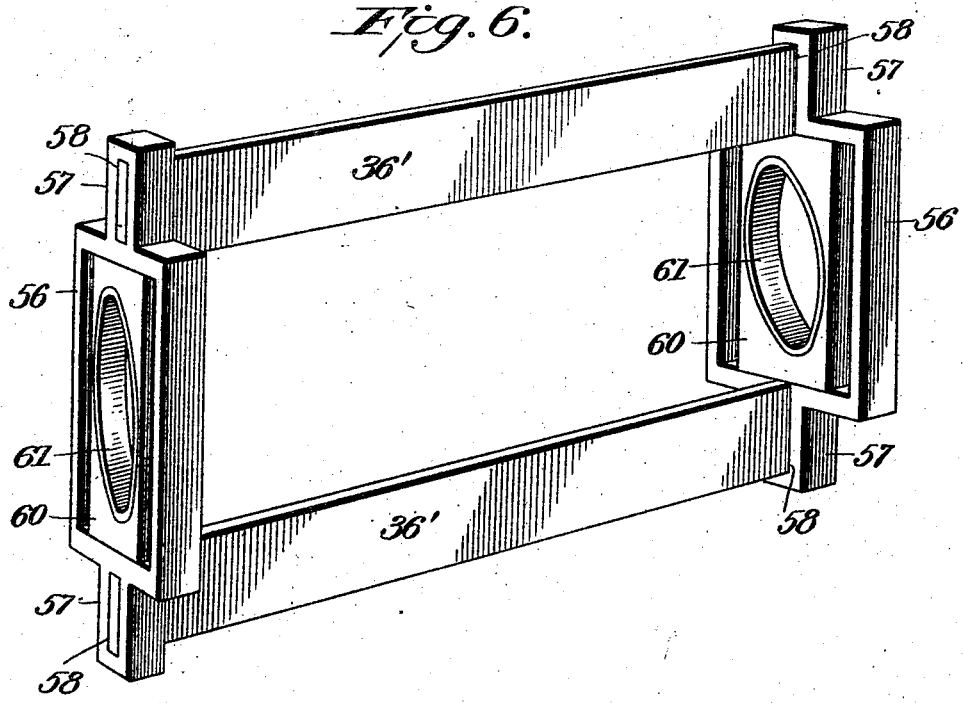
Fig. 6 is a detail perspective view of the pistons and their connecting yokes.
Figure 9:
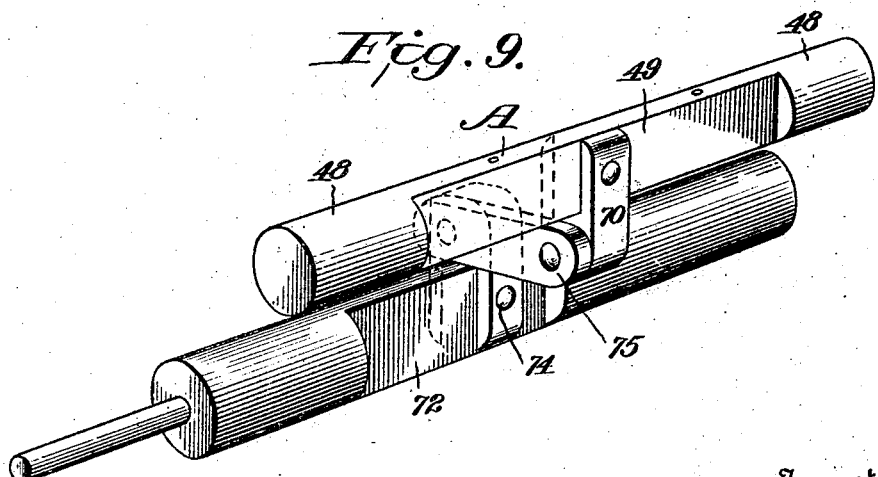
Fig. 9 is a detail perspective view of the fluid controlling valve including a part of the operating means therefor.
Figure 10:
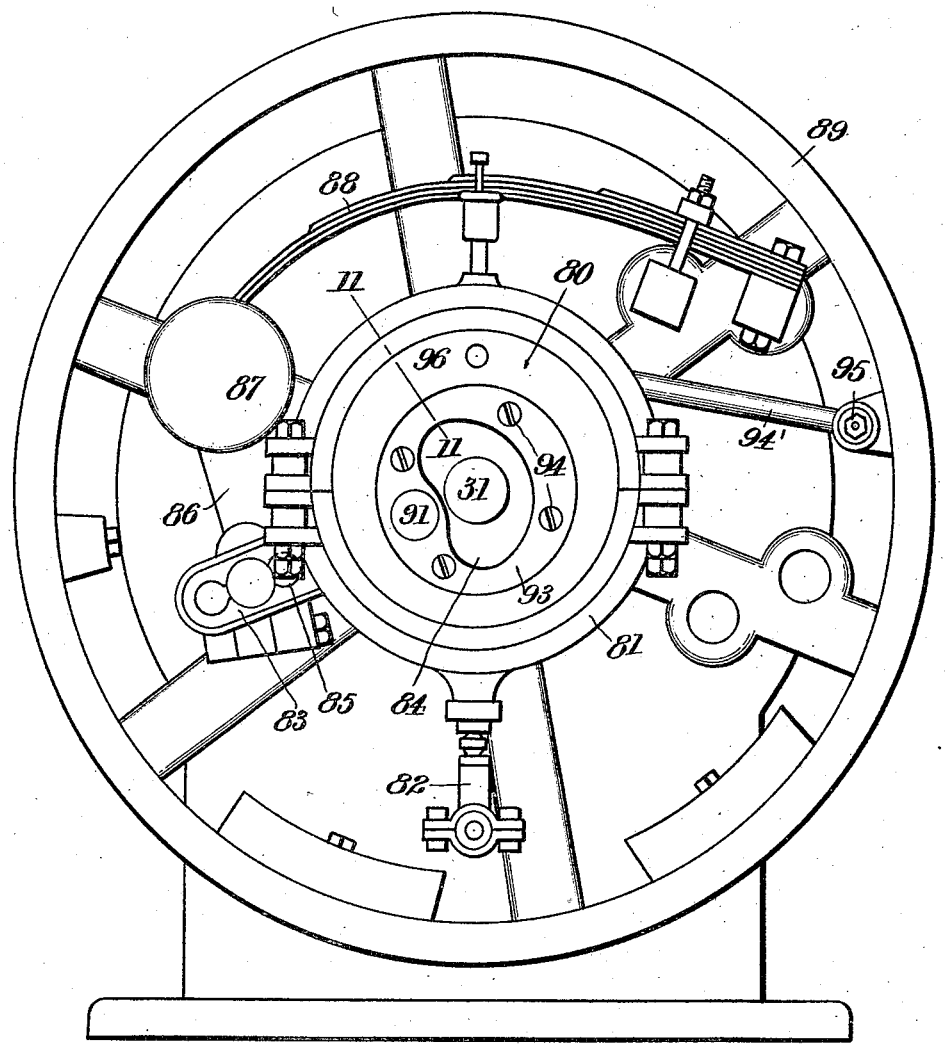
Fig. 10 is a face view of the governor for controlling the fluid operating valve.
Figure 11:
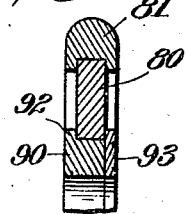
Fig. 11 is a sectional view on the line 11—11 of Fig. 10.

To facilitate starting the engine in the event the same be at rest and the carrier off center with the valve A in closed position, the operating fluid may be supplied to the port 47ª through a by-pass 97 unseating the valve 98 by manipulation of the valve stem 99 projecting through and having screw threaded connection with the engine casing, as shown in Fig. 2. A hand wheel 100 is secured to the outer end of the valve stem 99 to facilitate rotation of the same to seat and unseat the valve 98.

The operation of my device will be apparent from the above description. The compressed fluid for operating the rotating carrier is controlled by the intake valve which is located in the intake passage formed in the abutment and this intake valve is oscillated by the eccentric on the main shaft. As soon as the radial piston passes the intake ports, the rotary valve is opened to admit the operating fluid and this operating fluid acts on the pistons to rotate the carrier. After the fluid has fully expanded, it is then exhausted through the exhaust port on the low pressure side of the rotating carrier. The expanding forces of the fluid against the rotating carrier, that is, the non-rotating forces of the expanding fluid are counterbalanced by the pressure of said expanding fluid against the inner surface of the telescoping caps which are fixed to the rotating carrier. As above noted, the area of the surface of the caps covering the pockets in the abutment is substantially the same as the area of the rotating carrier subjected to these non-rotating forces. This effective counterbalancing of the carrier causes the carrier to float in its bearings as substantially all lateral pressure against the carrier is counterbalanced. The radial pistons make continual contact with the wall of the cylinder, so that there is little or no leak of the expanding fluid from one side of the radial piston to the other and the rotating force of the expanding fluid will be all directed against the effective radial piston. Inasmuch as the two radial pistons are each formed in solid sections and these radial pistons are rigidly connected together, so that they always maintain the same position relative to each other, the centrifugal force operating upon one piston will be perfectly balanced by the centrifugal force operating upon the other piston. Furthermore, these radial pistons are connected by yokes which are mounted in recesses in the end disks of the carrier and the projecting ends of the yokes to which the radial pistons are attached slide against the side walls of these recesses which makes very effective bearings for the yokes and the radial pistons, so that the lateral strain of the expanding forces transmitted by the radial pistons to the rotating carrier is distributed over a very large area which reduces greatly the wear between these parts as the same slide one on the other. The forming of the intake passage in the abutment brings the steam under boiler pressure or the compressed fluid under initial pressure close to the inner wall of the cylinder and this reduces to a minimum the clearance between the initial working pressure of the fluid and the radial piston. Furthermore, the forming of the eccentric which controls the intake valve in two parts and the shifting of these parts on each other as the eccentric shifts to vary the eccentricity thereof maintains the high point of the eccentric always substantially in the same radial line, so that for varying loads the opening of the intake valve may be maintained at the same point relative to the rotation of the radial pistons.

While I have described my improved rotating carrier and radial piston construction as especially adapted for use in a rotary engine where the pistons are driven by the expansion of steam or by a compressed fluid, it will be understood that these parts may be likewise used in an internal combustion engine wherein gases are compressed and exploded and, therefore, the use of the term "rotary engine" in the description and claims is intended to cover a rotary engine of any type, compressor, pump, or the like.

Having thus described my invention, what I claim as new and desire to secure by Letters Patent, is:

1. A rotary engine comprising a cylinder, a rotatable carrier in said cylinder, radial pistons mounted on said carrier, end plates fixed to said carrier, rigid yokes connecting the radial pistons, each end plate having a recess on its inner face adapted to house and guide one of said yokes, and fixed eccentrics for each yoke to move the same positively to move the pistons radially on the carrier.

2. A rotary engine comprising a cylinder, a rotary carrier in said cylinder, opposed radial pistons mounted on said carrier, rigid one-piece yokes rigidly connecting the ends of the pistons, each piston being formed in one-piece, said yokes having parallel outer walls extending in the direction of the radial pistons, end plates movable with the carrier and having recessed bearing surfaces for said outer walls.

3. A rotary engine comprising a cylinder, a rotating carrier in said cylinder, oppositely disposed one-piece radial pistons mounted on said carrier, and rigid one-piece yokes at each end of said carrier, each yoke having oppositely projecting portions provided with elongated slots to receive the ends of the radial pistons whereby said radial pistons are held in fixed relation to each other during the entire rotation of said carrier.

4. A rotary engine comprising a cylinder, a rotating carrier in said cylinder, radial pistons mounted on said carrier, end plates fixed to said carrier, rigid yokes connecting the radial pistons, each end plate having a recess adapted to house and guide one of the yokes, the inner wall of said cylinder being shaped so as to make continuous free running contact with the radial pistons at each point of the rotation of the said carrier.

5. A rotary engine comprising a cylinder, a rotating carrier in said cylinder, radial pistons mounted on said carrier, end plates fixed to said carrier, rigid yokes connecting the radial pistons, each end plate having a recess adapted to house and guide one of the yokes, the inner wall of said cylinder being shaped so as to make continuous free running contact with the radial pistons at each point of the rotation of said carrier, and fixed eccentrics, one for each yoke for moving the same positively to move the pistons radially on the carrier.

6. A rotary engine comprising a cylinder, a rotating carrier in said cylinder, opposed radial pistons mounted on said carrier, yokes rigidly connecting the ends of the pistons, said yokes having parallel outer walls extending in the direction of the radial pistons, end plates movable with the carrier and having bearing surfaces for said outer walls.

7. A rotary engine comprising a cylinder, a rotating carrier in said cylinder, opposed radial pistons mounted on said carrier, rigid yokes at each end of said carrier, said yokes having oppositely projecting members provided with elongated slots to receive the ends of the radial pistons, whereby said radial pistons are held in fixed relation to each other during the entire rotation of said carrier.

8. A rotary engine comprising a cylinder, a rotating carrier in said cylinder, opposed radial pistons mounted on said carrier, rigid yokes at each end of said carrier, said yokes having oppositely projecting members provided with elongated slots to receive the ends of the radial pistons, whereby said radial pistons are held in fixed relation to each other during the entire rotation of said carrier, the inner wall of said cylinder being shaped so as to make continuous free running contact with said pistons at each point in the rotation of said carrier.

9. A rotary engine comprising a cylinder, a rotating carrier in said cylinder, opposed radial pistons mounted on said carrier, rigid yokes at each end of said carrier, said yokes having oppositely projecting members provided with elongated slots to receive the ends of the radial pistons whereby said radial pistons are held in fixed relation to each other during the entire rotation of said carrier, and fixed eccentrics, one for each yoke for positively moving the same for sliding the pistons radially on the carrier.

10. A rotary engine comprising a cylinder, a rotating carrier in said cylinder, opposed radial pistons mounted on said carrier, rigid yokes at each end of said carrier, said yokes having oppositely projecting members provided with elongated slots to receive the ends of the radial pistons, whereby said radial pistons are held in fixed relation to each other during the entire rotation of said carrier, the inner wall of said cylinder being shaped so as to make continuous free running contact with said pistons at each point in the rotation of said carrier, and fixed eccentrics cooperating with said yokes for positively moving said pistons radially on said carrier.

11. A rotary engine comprising a cylinder, a rotating carrier in said cylinder, opposed radial pistons mounted on said carrier, yokes connecting the ends of said radial pistons, each yoke having a substantially rectangular central portion and radially projecting parts located centrally of the end members of the yokes, each projecting part having a connection with the radial pistons, a bearing block engaging the inner end walls of the yoke, and a fixed eccentric cooperating with each bearing block for moving the same to cause the yokes to shift the radial pistons.

12. A rotary engine comprising a cylinder, a rotating carrier in said cylinder, opposed radial pistons mounted on said carrier, yokes connecting the ends of said radial pistons, each yoke having a substantially rectangular central portion and radially projecting parts located centrally of the end members of the yokes, each projecting part having a connection with the radial pistons, a bearing block engaging the inner end walls of the yoke, a fixed eccentric cooperating with each bearing block for moving the same to cause the yokes to shift the radial pistons, and end disks mounted on said carrier, each end disk having a recess for the yoke, said recess being shaped so as to engage the outer side of the walls of the yoke and the side walls of the projecting parts connected with the radial pistons.

13. A rotary engine comprising a cylinder, a rotating carrier in said cylinder, a radial piston mounted on said carrier, yokes rigidly connected to said piston, and end disks mounted on said carrier and each having a recess for guiding the respective yoke in a direction parallel with the movement of the radial piston, each of said yokes having a rectangular opening, a block engaging the end walls of each yoke, and a fixed eccentric engaging each block for moving the respective yoke radially of said carrier.

14. A rotary engine comprising a cylinder, a rotating carrier in said cylinder, a radial piston mounted on said carrier, yokes rigidly connected to said piston, and end disks mounted on said carrier and each having a recess for guiding the respective yokes in a direction parallel with the movement of the radial piston, each yoke having a rectangular opening, a block engaging the end walls of each yoke, a fixed eccentric engaging each of said blocks for moving the yokes radially of said carrier, the inner wall of said cylinder being shaped so as to make continuous free running contact with said piston at all points in the rotation of said carrier.

15. The combination with a rotary engine including a cylinder having a rotatable piston carrier mounted therein and provided with an inlet chamber having intake ports leading therefrom to the cylinder and a valve in the inlet chamber for controlling the intake, of means for oscillating said valve including an eccentric ring, the supporting hub therefor, governing means for shifting said ring and their supporting hub bodily for varying the throw of said eccentric ring and means for moving said eccentric ring angularly on said hub when said ring and hub are shifted, whereby the intake valve will be opened at substantially the same point in the angular rotation of the eccentric ring for all adjustments thereof.

16. A rotary engine comprising a cylinder, a rotating carrier in said cylinder having contact with the wall thereof, a radial piston mounted on said carrier, said carrier being cylindrical in shape and having relatively small longitudinal grooves arranged side by side throughout the entire surface thereof, whereby said grooves operate in succession to trap and compress fluid at the point of contact between the carrier and the cylinder wall, whereby a continuous fluid seal is formed between the high and low pressure sides of the cylinder.

17. A rotary engine comprising a cylinder, a rotating carrier in said cylinder having contact with one wall thereof, a radial piston mounted on said carrier, said carrier being cylindrical in shape and having a series of relatively small grooves extending longitudinally thereof, each groove being rectangular in cross section and operating in succession to trap and compress the fluid at the point of contact between the carrier and the cylinder for forming a continuous fluid seal between the high and low pressure sides of the cylinder.

18. A rotary engine comprising a cylinder, a rotating carrier in said cylinder having contact with one wall thereof, a radial piston mounted on said carrier, said carrier being cylindrical in shape and having a series of relatively small grooves extending longitudinally thereof, each groove being rectangular in cross section and operating in succession to trap and compress the fluid at the point of contact between the carrier and the cylinder for forming a continuous fluid seal between the high and low pressure sides of the cylinder, said grooves being of such relative size that a series of grooves becomes operative simultaneously for forming the liquid seal.

19. A rotary engine comprising a cylinder, a rotating carrier in said cylinder, opposed radial pistons mounted on said carrier, rigid yokes at each end of said carrier, said yokes each having oppositely disposed elongated slots to receive the ends of the radial pistons, whereby said radial pistons are held in fixed relation to each other during the entire rotation of said carrier.

20. A rotary engine comprising a casing, an abutment in the casing forming the cylinder proper, a rotatable carrier in the cylinder, radial pistons on the carrier, the carrier having a recess in each end, a yoke slidable in each recess and having connection with said pistons, caps telescoping the ends of the abutment and cooperating with the walls of said recesses of the carrier to house the yokes in the recesses of the carrier.

21. A rotary engine comprising a casing, an abutment in the casing having a chamber forming the cylinder proper, a rotatable carrier in the cylinder, radial movable pistons on the carrier, means carried by the carrier and slidably confined within the ends of the same and connected to the pistons to operate the latter, and caps telescoping the ends of the abutment.

22. A rotary engine comprising a casing, an abutment mounted in the casing and having a chamber forming the cylinder proper, a rotating piston carrier in the cylinder, radial pistons mounted on said carrier, means having connection with the carrier and the pistons to operate the latter, caps telescoping the ends of the abutment, the abutment having an inlet supply passage extending substantially throughout the length thereof and having communication with the cylinder, a valve located in said passage and positioned relatively close to the inner wall of the abutment so as to reduce the clearance between the radial pistons and the intake controlling valve to a minimum.

In testimony whereof I affix my signature in presence of two witnesses.

BENJAMIN FRANKLIN AUGUSTINE.

Witnesses:
C. H. O. JENKINS,
MABEL G. BROWN.